(12) United States Patent
Yasunaga et al.

(10) Patent No.: US 9,983,505 B2
(45) Date of Patent: May 29, 2018

(54) DEVELOPING ROLLER, PROCESS CARTRIDGE, IMAGE FORMING APPARATUS AND IMAGE FORMING METHOD

(71) Applicants: Hideaki Yasunaga, Tokyo (JP); Keiichiro Juri, Kanagawa (JP)

(72) Inventors: Hideaki Yasunaga, Tokyo (JP); Keiichiro Juri, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days. days.

(21) Appl. No.: 15/492,688

(22) Filed: Apr. 20, 2017

(65) Prior Publication Data

US 2017/0219954 A1 Aug. 3, 2017

Related U.S. Application Data

(63) Continuation of application No. PCT/JP2015/077651, filed on Sep. 30, 2015.

(30) Foreign Application Priority Data

Nov. 5, 2014 (JP) .................................. 2014-225050

(51) Int. Cl.
 *G03G 15/08* (2006.01)
 *C08J 7/16* (2006.01)
 (Continued)

(52) U.S. Cl.
 CPC ..... *G03G 15/0818* (2013.01); *C08G 18/6279* (2013.01); *C08G 18/792* (2013.01);
 (Continued)

(58) Field of Classification Search
 CPC .................................................. G03G 15/0818
 (Continued)

(56) References Cited

U.S. PATENT DOCUMENTS 5,387,966 A * 2/1995 Karashima ......... G03G 15/0818
399/286
7,599,650 B2 * 10/2009 Katoh et al. ....... G03G 15/0818
399/279

(Continued)

FOREIGN PATENT DOCUMENTS

JP 11-073006 3/1999
JP 2000-181243 6/2000

(Continued)

OTHER PUBLICATIONS

International Search Report dated Nov. 10, 2015 for counterpart International Patent Application No. PCT/JP2015/077651 filed Sep. 30, 2015.

*Primary Examiner* — William J Royer
(74) *Attorney, Agent, or Firm* — Cooper & Dunham LLP

(57) ABSTRACT

Provided is a developing roller including a shaft body, an elastic layer formed on an external circumference of the shaft body, and a surface layer formed on an external circumference of the elastic layer. The surface layer is formed of polyurethane containing a reaction product of a fluoroethylene vinyl ether copolymer and an isocyanurate form of isocyanate and having a film thickness of from 0.5 μm through 2.0 μm. The developing roller has grooves in a surface of the developing roller. The angle of the grooves from a circumferential direction is from 0 degrees through 30 degrees.

12 Claims, 4 Drawing Sheets

(51) Int. Cl.
*C08G 18/62* (2006.01)
*C08G 18/79* (2006.01)

(52) U.S. Cl.
CPC ............. *C08J 7/16* (2013.01); *C08J 2371/03* (2013.01); *C08J 2475/04* (2013.01)

(58) Field of Classification Search
USPC .................................................. 399/279, 286
See application file for complete search history.

(56) References Cited

U.S. PATENT DOCUMENTS

| | | | |
|---|---|---|---|
| 7,720,428 | B2 | 5/2010 | Hagi et al. |
| 8,192,339 | B2 * | 6/2012 | Suzuki et al. ...... G03G 15/0818 492/28 |
| 8,521,071 | B2 * | 8/2013 | Nishimura ......... G03G 15/0818 399/286 |
| 8,526,864 | B2 | 9/2013 | Nakagawa et al. |
| 9,026,015 | B2 | 5/2015 | Juri et al. |
| 9,158,228 | B2 * | 10/2015 | Ogawa et al. ...... G03G 15/0818 |
| 2005/0226659 | A1 | 10/2005 | Ebe |
| 2006/0204882 | A1 | 9/2006 | Nozaki et al. |
| 2006/0275686 | A1 | 12/2006 | Kadota et al. |
| 2007/0059625 | A1 | 3/2007 | Yamamoto et al. |
| 2007/0122729 | A1 | 5/2007 | Katoh et al. |
| 2007/0148568 | A1 | 6/2007 | Kadota et al. |
| 2007/0190443 | A1 | 8/2007 | Hagi et al. |
| 2007/0207399 | A1 | 9/2007 | Kadota et al. |
| 2007/0212630 | A1 | 9/2007 | Yasunaga et al. |
| 2007/0217842 | A1 | 9/2007 | Kato et al. |
| 2007/0238042 | A1 | 10/2007 | Yasunaga et al. |
| 2008/0038656 | A1 | 2/2008 | Yasunaga et al. |
| 2008/0063957 | A1 | 3/2008 | Murakami et al. |
| 2008/0069598 | A1 | 3/2008 | Murakami et al. |
| 2008/0069605 | A1 | 3/2008 | Fuwa et al. |
| 2008/0069608 | A1 | 3/2008 | Katoh et al. |
| 2008/0070149 | A1 | 3/2008 | Kato et al. |
| 2008/0153018 | A1 | 6/2008 | Mikuriya et al. |
| 2008/0159777 | A1 | 7/2008 | Fuwa et al. |
| 2008/0175630 | A1 | 7/2008 | Yasunaga et al. |
| 2008/0226356 | A1 | 9/2008 | Yasunaga et al. |
| 2008/0227009 | A1 | 9/2008 | Fuwa et al. |
| 2008/0233506 | A1 | 9/2008 | Hagi et al. |
| 2008/0279591 | A1 | 11/2008 | Yasunaga et al. |
| 2008/0304875 | A1 | 12/2008 | Katoh et al. |
| 2009/0041511 | A1 | 2/2009 | Fuwa et al. |
| 2009/0052952 | A1 | 2/2009 | Katoh et al. |
| 2009/0117481 | A1 | 5/2009 | Yasunaga et al. |
| 2009/0169270 | A1 | 7/2009 | Fuwa et al. |
| 2009/0186291 | A1 | 7/2009 | Mikuriya et al. |
| 2010/0009282 | A1 | 1/2010 | Katoh et al. |
| 2010/0167196 | A1 | 7/2010 | Hagi et al. |
| 2012/0237270 | A1 | 9/2012 | Juri et al. |
| 2013/0058685 | A1 | 3/2013 | Juri et al. |
| 2014/0321888 | A1 | 10/2014 | Yasunaga et al. |
| 2015/0078777 | A1 | 3/2015 | Juri et al. |
| 2015/0078790 | A1 | 3/2015 | Ishikawa et al. |

FOREIGN PATENT DOCUMENTS

| | | |
|---|---|---|
| JP | 2002-023483 | 1/2002 |
| JP | 2004-347664 | 12/2004 |
| JP | 2005-300634 | 10/2005 |
| JP | 2008-281739 | 11/2008 |
| JP | 2014-215546 | 11/2014 |

* cited by examiner

DEVELOPING ROLLER, PROCESS CARTRIDGE, IMAGE FORMING APPARATUS AND IMAGE FORMING METHOD

CROSS-REFERENCE TO RELATED APPLICATIONS

The present application is a continuation application of International Application No. PCT/JP2015/077651, filed Sep. 30, 2015, which claims priority to Japanese Patent Application No. 2014-225050, filed Nov. 5, 2014. The contents of these applications are incorporated herein by reference in their entirety.

BACKGROUND OF THE INVENTION

Field of the Invention

The present invention relates to a developing roller, a process cartridge, an image forming apparatus, and an image forming method.

Description of the Related Art

One-component developing methods are known as developing methods in electrophotography. One-component developing is known to be an inexpensive developing method having a simple configuration. In one-component developing, there is known a need for applying a high linear pressure to a toner with a regulating blade in order to stabilize conveyance of electric charges.

Examples of the members used in the developing method include a developing roller. For the factor described above, the surface of the developing roller is filmed with the toner component through continued use and cannot maintain the initial state, leading to electric charge conveying ability degradation, which has been the one-component developing method's inherent problem. To this problem, there are known a technique of using a highly releasable material on the surface of the developing roller to suppress filming, and a technique of providing minute concaves and convexes in the surface of the developing roller to reduce the area to contact the filming component.

For example, Japanese Unexamined Patent Application Publication No. 2004-347664 discloses that a surface layer of a developing roller is formed of a cross-linking reaction product of a resin containing a fluorine group and a hydroxyl group and one or more amino resins, and that the object is to prevent toner filming by coating the surface layer of the developing roller with fluorine and to prevent the surface layer from peeling to aim for a longer life of the product.

However, according to Japanese Unexamined Patent Application Publication No. 2004-347664, the developing roller has a poor scraping ability due to the high releasability and cannot reduce adhesion of the toner component and the filming component on a member contacting the developing roller when there is much adhesion on that member. For this reason, this developing roller has not been able to overcome a problem that a streak is generated in the thin toner layer on the developing roller, to eventually generate abnormal images such as longitudinal white streaks on images such as solid images and halftone images.

SUMMARY OF THE INVENTION

According to one aspect of the present invention, a developing roller includes a shaft body, an elastic layer formed on an external circumference of the shaft body, and a surface layer formed on an external circumference of the elastic layer. The surface layer is formed of polyurethane containing a reaction product of a fluoroethylene vinyl ether copolymer and an isocyanurate form of isocyanate and having a film thickness of from 0.5 µm through 2.0 µm. The developing roller has grooves in a surface of the developing roller. The angle of the grooves from a circumferential direction is from 0 degrees through 30 degrees.

DESCRIPTION OF THE EMBODIMENTS

Figure 1:
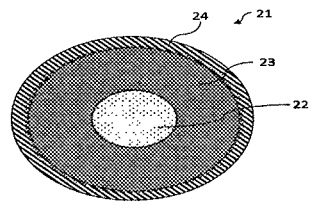
FIG. 1 is an exemplary view presenting a cross-section of an example of a developing roller.

A developing roller, a process cartridge, an image forming apparatus, and an image forming method of the present invention will be described below with reference to the drawings. The present invention is not limited to the embodiment described below, but any other embodiment, addition, modification, deletion, etc. are available within the conceivable scope of persons skilled in the art. Any modes that have the working and effect of the present invention are intended to be included within the scope of the present invention.

In consideration of the problem described above, the present invention has an object to provide a developing roller that can suppress abnormal images such as longitudinal white streaks in continued use even when the developing roller has a high releasability for suppression of filming.

The present invention can provide a developing roller that can suppress abnormal images such as longitudinal white streaks in continued use even when the developing roller has a high releasability for suppression of filming.

(Developing Roller)

A developing roller 21 of the present invention includes a shaft body 22, an elastic layer 23 formed on an external circumference of the shaft body 22, and a surface layer 24 formed on an external circumference of the elastic layer 23. The surface layer 24 is formed of polyurethane containing a reaction product of a fluoroethylene vinyl ether copolymer and an isocyanurate form of isocyanate and having a film thickness of from 0.5 µm through 2.0 µm. The developing roller 21 has grooves 25 in the surface of the developing roller 21. The angle of the grooves 25 from a circumferential direction is from 0 degrees through 30 degrees.

FIG. 1 illustrates an exemplary view of a cross-section of an example of the developing roller 21. In FIG. 1 illustrating the developing roller 21, the shaft body 22, the elastic layer 23 formed on the external circumference of the shaft body 22, and the surface layer 24 formed on the external circumference of the elastic layer 23 are illustrated. The details will be described below.

<Shaft Body>

The shaft body 22 is not particularly limited and may be an elongate right-cylindrical metal (e.g., iron, aluminum alloy, and stainless steel).

<Elastic Layer>

The elastic layer 23 is not particularly limited and may be a rubber composition. Examples of the rubber component of the rubber composition include natural rubber, chloroprene rubber, styrene-butadiene rubber, ethylene-propylene rubber (EPDM), butyl rubber, acrylonitrile-butadiene rubber (NBR), isoprene rubber, silicone rubber, epichlorohydrin rubber, and urethane rubber.

The thickness of the elastic layer 23 is preferably from 1 mm through 10 mm.

The method for forming the elastic layer 23 is not particularly limited, and examples of the method include a method of extrusion-molding the rubber composition on the shaft body 22 and firing and vulcanizing the resultant.

<Grooves>

The developing roller 21 according to the present embodiment has grooves 25 in the surface of the developing roller 21. The angle of the grooves 25 from the circumferential direction is from 0 degrees through 30 degrees. In the present embodiment, the developing roller 21 has a highly releasable thin film (surface layer 24) on the surface of the elastic layer 23 having minute concaves and convexes, to have the grooves 25 in the surface.

Figure 2A:
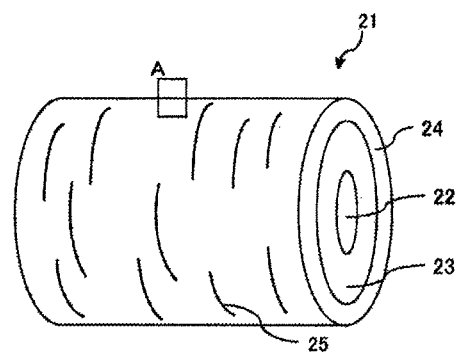
FIG. 2A is an exemplary view of an example of a developing roller of the present invention when seen diagonally.
Figure 2B:
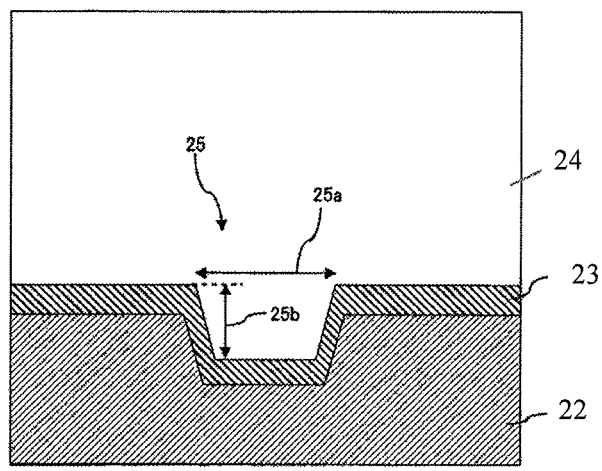
FIG. 2B is an exemplary view presenting a partial cross-section of an example of a developing roller of the present invention when seen diagonally.

FIG. 2A and FIG. 2B illustrate an exemplary view of and an exemplary view of a partial cross-section of an embodiment of the developing roller 21 of the present invention when seen diagonally. FIG. 2A illustrates the grooves 25 in the circumferential direction. FIG. 2B illustrates a partial cross-sectional view presenting a surface perpendicular to the circumferential direction (i.e., a surface parallel with the axial direction of the developing roller 21). FIG. 2B exemplarily illustrates an enlarged view of a region A of FIG. 2A.

As illustrated in FIG. 2B, the grooves 25 formed in the surface have a width 25a with respect to the circumferential direction and a depth 25b. In the present embodiment, as illustrated in FIG. 2B, the surface layer 24 is formed also on the surface of the concaves in the elastic layer 23. There is no need that the surface layer 24 be formed in every groove 25 in the elastic layer 23, but there may be a groove 25 in which the surface layer 24 is not formed, so long as the present invention can achieve the intended effect.

According to the present embodiment, the highly releasable thin film can suppress filming and the grooves 25 can improve the ability to scrape the filming component. In the present embodiment, these effects can be both achieved. Therefore, even though the developing roller 21 has a high releasability for suppression of filming, abnormal images can be suppressed in continued use of the developing roller 21.

The filming component scraped by the grooves 25 can be bound to the grooves 25 to some degree. Therefore, it is possible to suppress abnormal images while suppressing filming.

In the present embodiment, the filming component that has adhered on a member (referred to as contacting member) contacting the developing roller 21 can be scraped by the grooves 25 formed in the surface of the developing roller 21. Examples of the contacting member include a photoconductor, a charging roller, and a regulating blade.

It is preferable that the grooves 25 have a width, a length, and a depth that can bind a toner to some degree without letting the toner particles having a diameter of from 5 μm through 6 μm or the filming component having a diameter of from 1 μm through 2 μm be stuck in the concaves in the surface of the developing roller 21. Examples of the filming component include an aggregate, formed to have a diameter of from about 1 μm through about 2 μm, of silica contained in the toner component.

The grooves 25 may be of any width, any length, and any depth that are not particularly limited and may be changed depending on, for example, the size of the filming component and the size of the toner particles, so long as the angle of the grooves 25 from the circumferential direction is from 0 degrees through 30 degrees. However, it is preferable that the angle of the grooves 25 from the circumferential direction be from 0 degrees through 15 degrees. In the present embodiment, it is preferable that the grooves 25 have a width of from 10 μm through 20 μm, a length of from 20 μm through 100 μm, and a depth of from 5 μm through 15 μm. Within these ranges, scaly images, streaky images, and filming can be better suppressed.

Figure 3A:
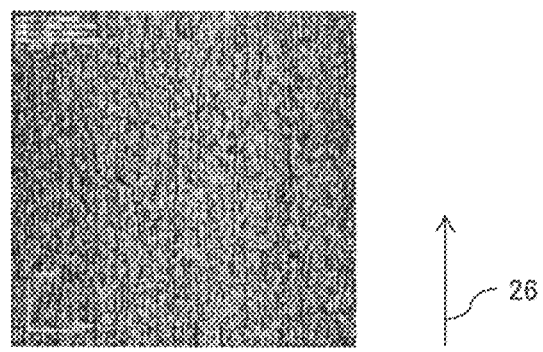
FIG. 3A is an image view of a surface of an elastic layer in an example of a developing roller of the present invention.
Figure 3B:
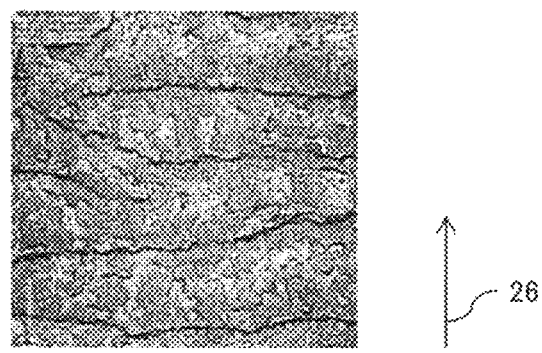
FIG. 3B is an image view of a surface of an elastic layer in another example of a developing roller.

FIG. 3A and FIG. 3B each illustrate an example of a SEM image of the surface of the elastic layer 23 before the surface layer 24 is formed. FIG. 3A concerns the present invention. FIG. 3B does not concern the present invention. As illustrated, grooves are formed along the circumferential direction denoted by a sign 26 in FIG. 3A, whereas grooves are not formed along the circumferential direction but streaks are generated in a direction perpendicular to the circumferential direction in FIG. 3B. The method for forming the grooves 25 will be described below, but the grooves 25 can be formed by polishing the surface layer 24 to form the minute concaves and convexes described above and then forming the surface layer 24.

Figure 4:
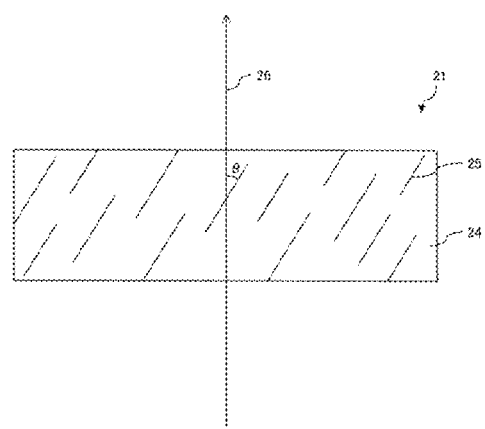
FIG. 4 is an exemplary view presenting an angle of grooves measured from a circumferential direction in an example of a developing roller of the present invention.

FIG. 4 illustrates an exemplary view depicting the angle of the grooves 25 from the circumferential direction. In FIG. 4, the angle of the grooves 25 from the circumferential direction indicated by an arrow 26 is represented by θ. The angle θ, i.e., the angle of the grooves 25 from the circumferential direction is from 0 degrees through 30 degrees. Within this range, it is possible to suppress abnormal images while suppressing filming. When the angle is greater than 30 degrees, abnormal images such as longitudinal white streaks may be generated. FIG. 4 is an expedient view for depicting the angle of the grooves 25. Therefore, an angle of from −30 degrees through 0 degrees in FIG. 4 is also included within the scope of the present invention.

When there are a plurality of grooves 25, there is no need that all of the grooves 25 be aligned in the same direction, but the directions may be varied to some degree. The grooves 25 may cross each other or may not cross each other.

It is preferable that the number of grooves 25 formed per 1 $mm^2$ be from 600 through 1,100. Within this range, scaly images, streaky images, and filming can be better suppressed. When the number of the grooves 25 is less than 600, abnormal images such as streaky images may be generated. When the number of the grooves 25 is greater than 1,100, filming may not be suppressed and abnormal images such as scaly images (image unevenness) may be generated.

The method for forming the grooves 25 is not particularly limited, and examples of the method include the method described below. The elastic layer 23 is formed on the external circumference of the shaft body 22. The elastic layer 23 thus formed is polished to form minute concaves and convexes. After polishing, a coating liquid for the surface layer 24 is coated to form the surface layer 24 having a predetermined film thickness. In this way, the developing roller 21 having the grooves 25 in the surface can be obtained.

The polishing can be divided into a step of rough polishing and a step of finish-up polishing.

For rough polishing, for example, LEO600-F4L-BME available from Minakuchi Machinery Works Ltd. may be used. For finish-up polishing, SZC available from Minakuchi Machinery Works Ltd. may be used.

The shape (width, length, and depth) of the grooves 25 can be controlled by changing polishing conditions such as the kind of the tape (tape count), oscillation frequency, tape contact frequency, and finishing time.

<Surface Layer>

Next, the surface layer 24 formed on the external circumference of the elastic layer 23 will be described. In the present embodiment, the surface layer 24 is a film of polyurethane containing a reaction product of a fluoroethylene vinyl ether copolymer and an isocyanurate form of isocyanate. It is preferable that the surface layer 24 contain inorganic particles (filler). The surface layer 24 may contain other components such as a conductive material as needed.

In the present embodiment, the film thickness of the surface layer 24 is from 0.5 µm through 2.0 µm. When the film thickness of the surface layer 24 satisfies the range described above, the minute concaves and convexes of the elastic layer 23 can surface. This makes it possible to prevent abnormal images while suppressing filming. The surfacing minute concaves and convexes of the elastic layer 23 form the grooves 25 in the surface of the developing roller 21. Therefore, the toner component and the filming component, which contribute to abnormal images, can be bound to the developing roller 21 to some degree, and the scraping ability can be improved. Besides, filming can be suppressed by the highly releasable thin film.

When the film thickness of the surface layer 24 is less than 0.5 µm, filming cannot be suppressed sufficiently, and scaly images (image unevenness) may be generated. When the film thickness of the surface layer 24 is greater than 2.0 µm, filming cannot be suppressed sufficiently, and streaky images may be generated.

Figure 7:
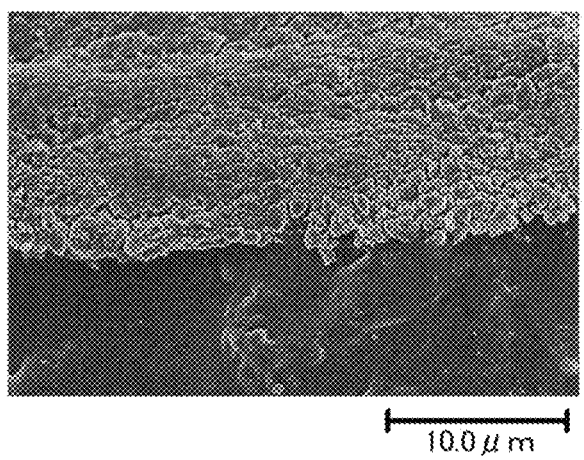
FIG. 7 is a view illustrating an example of a state in which a surface of a developing roller is filmed with a toner.

FIG. 7 illustrates an example of a state in which a surface of a developing roller, which is a common existing developing roller, is filmed with a toner. The black portion in the lower side of FIG. 7 is an elastic body on the circumference of a shaft body, and the slightly white portion in the upper side is the filming component coating the elastic body. The filming component here is an aggregate of, for example, particles having a particle diameter of about 1 pin, a shell material, and an externally-added treatment oil.

In the present embodiment, it is possible to suppress such filming by providing the surface layer 24 formed of the specific material described above on the surface of the developing roller 21. In the surface layer 24 of the present embodiment, the site attributed to the fluoroethylene vinyl ether copolymer of polyurethane has the high releasing function attributable to fluorine and contributes to suppression of filming.

Fluoroethylene Vinyl Ether Copolymer

The fluoroethylene vinyl ether copolymer is a product obtained by copolymerizing fluoroethylene and vinyl ether. The fluoroethylene vinyl ether copolymer is not particularly limited. Examples of the fluoroethylene vinyl ether copolymer include tetrafluoride-based fluororesins and trifluoride-based fluororesins. In terms of solubility in a solvent and reactivity with a curing agent, trifluoride-based fluororesins are preferable, and trifluoromonochloro-based fluororesins are particularly preferable.

Examples of commercially available products include LUMIFLON available from Asahi Glass Co., Ltd. Examples of this series of commercially available products include LUMIFLON LF-200 available from Asahi Glass Co., Ltd.

—Isocyanate—

In the present embodiment, an isocyanurate form of isocyanate is used in the polyurethane film of the surface layer 24.

Examples of the isocyanate as the constituent component of polyurethane include isocyanates such as methylene diphenyl diisocyanate (MDI), tolylene diisocyanate (TDI), xylylene diisocyanate (XDI), naphthylene 1,5-diisocyanate (NDI), tetramethyl xylylene diisocyanate (TMXDI), isophorone diisocyanate (IPDI), hydrogenated xylylene diisocyanate (H6XDI), dicyclohexylmethane diisocyanate (H12MDI), hexamethylene diisocyanate (HDI), dimer acid diisocyanate (DDI), norbornene diisocyanate (NBDI), and trimethyl hexamethylene diisocyanate (TMDI). The isocyanurate forms of these isocyanates are used. One of these isocyanurate forms may be used alone or two or more of these isocyanurate forms may be used in combination.

Among these isocyanurate forms, the isocyanurate form of tolylene diisocyanate and the isocyanurate form of hexamethylene diisocyanate are preferable because a residual isocyanate has a relatively low reactivity to make it possible to earn a pot life. Of these isocyanurate forms, the isocyanurate form of hexamethylene diisocyanate is particularly preferable.

These isocyanurate forms may be commercially available products. Examples of the commercially available products include an isocyanurate form of hexamethylene diisocyanate (available from Mitsui Chemicals, Inc., D170N) and an isocyanurate form of tolylene diisocyanate (available from Mitsui Chemicals, Inc., D262).

A peak intensity ratio (NCO/OH) of peak intensity of NCO group to peak intensity of hydroxyl group in an infrared absorption spectrum when polyurethane used in the present embodiment is measured by an ATR method (attenuated total reflection absorption spectroscopy) is preferably from 5.6 through 8.8 and more preferably from 6.4 through 8.0. When the peak intensity ratio is outside the specified range, releasability may be poor to increase filming.

—Inorganic Particles—

It is preferable that the surface layer 24 of the present embodiment contain inorganic particles (filler).

Examples of the inorganic particles include particles of silica, alumina, magnesium oxide, titanium, and magnetite, and mixtures of these particles. In consideration of sedimentation in a coating liquid, silica or alumina having a low specific gravity is preferable. Particularly, silica hydrophobized with a hydrophobization treatment agent such as hexamethyl disilazane (HMDS), polydimethyl siloxane (PDMS), and dimethyl dicyclosilane (DDS) is preferable.

Examples of the hydrophobizing method include a method of adding a hydrophobization treatment agent in a silica particle dispersion liquid, allowing the hydrophobization treatment agent to undergo a reaction at, for example, from 30 degrees C. through 80 degrees C. to apply hydrophobization treatment, and then drying the resultant to obtain hydrophobized silica, and a method of allowing powder hydrophilic silica and a hydrophobization treatment agent to undergo a reaction using, for example, a Henschel mixer under heating at from about 100 degrees C. through about 200 degrees C. to obtain hydrophobized silica.

The inorganic particles are preferably silica having an average primary particle diameter of from 5 nm through 30 nm, more preferably from 10 nm through 20 nm. This makes it possible to suppress silica filming on the developing roller due to an external additive of a toner, and to secure durable scraping stability.

It is preferable that the surface layer contain the inorganic particles in an amount of from 0.5% by mass through 3.0% by mass of the total amount of the surface layer. Within this range, the filming suppressing effect described above can be expected without an adverse effect on the concaves and convexes of the surface of the developing roller.

Other Components

The conductive material is not particularly limited and may be appropriately selected depending on the intended purpose. Examples of the conductive material include: conductive carbon such as Ketjen black EC and acetylene black; carbon for rubber, such as SAF, ISAF, HAF, FEF, GPF, SRF, FT, and MT; carbon for color and pyrolytic carbon to which, for example, oxidation treatment is applied; metals and metal oxides such as indium-doped tin oxide (ITO), tin oxide, titanium oxide, zinc oxide, copper, silver, and germanium; and conductive polymers such as polyaniline, polypyrrole, and polyacetylene. One of these conductive materials may be used alone or two or more of these conductive materials may be used in combination.

The content of the conductive material in the surface layer 24 is not particularly limited, may be appropriately selected depending on the intended purpose, and is preferably from 1 part by mass through 50 parts by mass relative to 100 parts by mass of polyurethane.

Further examples of the other components include a solvent, a softener, a processing aid, an anti-aging agent, a filler, a stiffener, and a lubricant.

The solvent is not particularly limited and may be appropriately selected depending on the intended purpose. Examples of the solvent include: ketone-based solvents such as acetone, methyl ethyl ketone, and cyclohexanone; aromatic hydrocarbon-based solvents such as toluene and xylene; aliphatic hydrocarbon-based solvents such as hexane; alicyclic hydrocarbon-based solvents such as cyclohexane; ester-based solvents such as ethyl acetate and butyl acetate; ether-based solvents such as isopropyl ether and tetrahydrofuran; amide-based solvents such as dimethyl sulfoamide; halogenated hydrocarbon-based solvents such as chloroform and dichloroethane; and mixture solvents of these solvents.

The method for forming the surface layer 24 is not particularly limited and may be appropriately selected depending on the intended purpose. The following method may be employed. The reaction product of the fluoroethylene vinyl ether copolymer and the isocyanurate form of isocyanate, the conductive material, the filler, and the other components are dissolved or dispersed in a solvent, to prepare a coating liquid. The prepared coating liquid is coated on the elastic layer 23 by, for example, a dip method, a roll coater method, a doctor blade method, or a spray method, and dried at normal temperature or a high temperature of from about 50 degrees C. through about 170 degrees C., to allow the materials to react and cure.

The following method may also be employed. The fluoroethylene vinyl ether copolymer, the isocyanurate form of isocyanate, the conductive material, the filler, and the other components are dissolved or dispersed in a solvent, to prepare a coating liquid. The prepared coating liquid is coated on the elastic layer 23 by, for example, a dip method, a roll coater method, a doctor blade method, or a spray method, and dried at a high temperature of from about 50 degrees C. through about 170 degrees C. In this way, the fluoroethylene vinyl ether copolymer and the isocyanurate form of isocyanate are allowed to react, to obtain the reaction product and form the surface layer.

(Toner)

The developing roller 21 of the present embodiment is also effective when a toner having a core-shell structure and having a high external additive coverage is used. Such a toner having a core-shell structure has been known, and a method and materials for producing such a toner are not particularly limited. Examples of such a toner include a toner having a structure obtained by coating a surface of a toner base produced by a wet granulation method such as a suspension polymerization method, an emulsion aggregation association method, and a dissolution suspension method with, for example, a vinyl-based resin, a polyurethane resin, an epoxy resin, or a polyester resin.

When an external additive is attached on the surface of such a toner, toner particles are obtained. A toner having a high external additive coverage refers to a toner formed of a toner base having a surface area with respect to which a projected area of the external additive is at a ratio of 150% or greater. Calculation of this ratio is performed by assuming both of the surface area of the toner base and the projected area of the external additive as areas of spheres each having a volume average diameter obtained by measurement.

The toner used with the developing roller 21 of the present embodiment may be a one-component type or a two-component type.

The particle diameter of the toner used is not particularly limited and may be appropriately changed depending on the shape of the grooves 25 described above. For example, when the grooves 25 have a width of from 10 μm through 20 μm, a length of from 20 μm through 100 μm, and a depth of from 5 μm through 15 μm, the particle diameter of the toner is preferably from 5.0 μm through 6.0 μm. In this case, the toner can be bound to the grooves 25 to some degree, and filming can be better suppressed.

(Process Cartridge)

Figure 5:
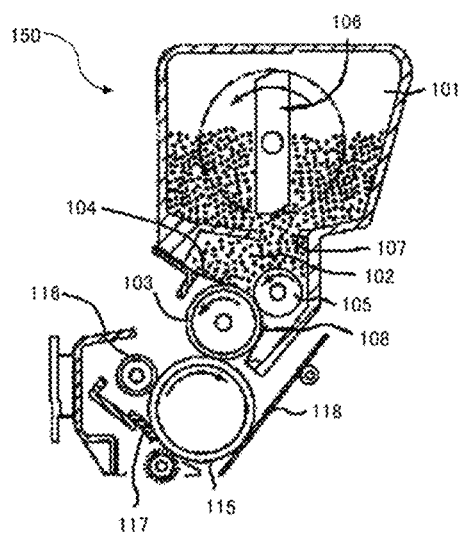
FIG. 5 is an exemplary view illustrating an example of a process cartridge of the present invention.

FIG. 5 is a cross-sectional view of an embodiment of a developing device 150 constituting a part of an image forming apparatus of the present invention and an embodiment of a process cartridge unit.

A developing device 150 includes a toner stored chamber 101 configured to store a toner, and a toner supplying chamber 102 provided below the toner stored chamber 101. A developing roller 103, a regulating blade 104 as a layer regulating member, and a supplying roller 105 are provided below the toner supplying chamber 102. The regulating blade 104 is provided to contact the developing roller 103. The process cartridge of the present invention is attachable and detachable to/from the main body of the image forming apparatus.

The developing roller 103 is disposed to contact a photoconductor 115. A predetermined developing bias is applied to the developing roller 103 from an unillustrated high-voltage power supply. A toner stirring member 106 is provided in the toner stored chamber 101. In the present embodiment, the toner stirring member 106 rotates in the counterclockwise direction.

In an axial direction of the toner stirring member 106, the toner stirring member 106 has a portion at which the edge of the toner stirring member 106 does not pass adjacent an outlet 107. At this portion, the toner stirring member 106 has a wide surface for conveying a toner by rotational driving, to sufficiently fluidize and stir the stored toner. The toner stirring member 106 also has a portion at which the edge of the toner stirring member 106 passes adjacent the outlet 107. At this portion, the toner stirring member 106 is shaped to have a narrow surface for conveying a toner by rotational driving, to prevent an excessive amount of a toner from being guided to the outlet 107.

The toner adjacent the outlet 107 is adequately loosened by the toner stirring member 106 and passes through the outlet 107 by the own weight to fall and move into the toner supplying chamber 102. The surface of the supplying roller 105 is covered with a foamed material having a structure containing pores (cells). This makes the toner having been conveyed into the toner supplying chamber 102 be efficiently attached and taken in, and also prevents the toner from being deteriorated due to pressure concentration at a contact part at which the supplying roller 105 contacts the developing roller 103. The foamed material is set to an electric resistance value of, for example, from $10^3 \Omega$ through $10^{14} \Omega$.

A supplying bias having a value obtained by offsetting the developing bias to the same direction as the polarity to which the toner is charged is applied to the supplying roller 105. The supplying bias acts in a direction to press the toner, which has been preliminarily charged at the contact part at which the supplying roller 105 contacts the developing roller 103, onto the developing roller 103. However, the offset direction is not limited to the above, but depending on the kind of the toner, the offset may be 0 or the offset direction may be changed.

The supplying roller 105 of the present embodiment rotates in the counterclockwise direction, and coats and supplies the surface of the developing roller 103 with the toner attached on the surface of the supplying roller 105. The developing roller 21 of the present invention is used as the developing roller 103. The developing roller 103 rotates in the counterclockwise direction to convey the toner supported on the surface of the developing roller 103 to the positions at which the developing roller 103 faces the regulating blade 104 and the photoconductor 115 (image bearer). The regulating blade 104 may be a metallic leaf spring member such as SUS304CSP, SUS301CSP, or phosphor bronze. A free end side of the regulating blade 104 is made to contact the surface of the developing roller 103 at a pressing force of from 10 N/m through 100 N/m. The regulating blade 104 forms the toner that has passed the pressing force into a thin layer and imparts charges to the toner by triboelectric charging.

A regulating bias having a value obtained by offsetting the developing bias to the same direction as the polarity to which the toner is charged is applied to the regulating blade 104 for assisting in triboelectric charging. In the present embodiment, the photoconductor 115 rotates in the clockwise direction. Therefore, the surface of the developing roller 103 moves in the same direction as the moving direction of the photoconductor 115 at the position at which the developing roller 103 faces the photoconductor 115.

As the developing roller 103 rotates, the toner formed into a thin layer is conveyed to the position at which the developing roller 103 faces the photoconductor 115 and moves toward the surface of the photoconductor 115 to develop an image according to the developing bias applied to the developing roller 103 and a latent image electric field formed by an electrostatic latent image on the photoconductor 115. Any toner remaining on the developing roller 103 without being developed as an image on the photoconductor 115 is returned to the toner supplying chamber 102. On the way to return to the toner supplying chamber 102, a seal 108 is provided to contact the developing roller 103, and the toner is sealed so as not to leak outside the developing device 150.

The photoconductor 115 may be of any material, any shape, any structure, any size, etc. that are not particularly limited and may be appropriately selected depending on the intended purpose. Examples of the shape include a drum shape, a sheet shape, and an endless belt-type shape. The structure may be a single-layer structure or a laminated structure. The size may be appropriately selected depending on, for example, the size and specifications of the image forming apparatus. In terms of the material, the photoconductor 115 may be an inorganic photoconductor formed of, for example, amorphous silicon, selenium, CdS, or ZnO or an organic photoconductor (OPC) formed of, for example, polysilane or phthalopolymethine.

The amorphous silicon photoconductor is produced by heating a support to, for example, from 50 degrees C. through 400 degrees C., and forming a photoconductive layer of a-Si by a film forming method such as a vacuum deposition method, a sputtering method, an ion plating method, a thermal CVD (chemical vapor deposition) method, a photo-CVD method, and a plasma CVD method. Among these methods, a plasma CVD method is particularly preferable. Specifically, a method of decomposing a material gas by a direct current, a high frequency, or a microwave glow discharge to form a photoconductive layer of a-Si on a support is preferable.

The organic photoconductors (OPC) are widely used because of, for example, (1) optical properties such as a wide light absorption wavelength range and a high light absorption amount, (2) electric properties such as a high sensitivity and a stable charging property, (3) a wide material selection range, (4) ease of production, (5) inexpensiveness, and (6) non-toxicity. The layer structure of the organic photoconductor is roughly classified into a single-layer structure and a laminated structure. An image bearer having the single-layer structure is formed of a support and a single-layer photoconductive layer provided on the support, and further includes a protective layer, an intermediate layer, and any other layer as needed.

An image bearer having the laminated structure is formed of a support and a laminated photoconductive layer including at least a charge generating layer and a charge transport layer in this order on the support, and further includes a protective layer, an intermediate layer, and any other layer as needed.

FIG. 5 illustrates a charging unit 116. The charging unit 116 is not particularly limited and may be appropriately selected depending on the intended purpose so long as the charging unit 116 can apply a voltage to the surface of the photoconductor 115 and uniformly charge the surface of the photoconductor 115. The charging unit 116 is roughly classified into (1) a contact type charging unit configured to contact the image bearer and charge the image bearer, and (2) a contactless charging unit configured to contactlessly charge the image bearer.

Examples of (1) the contact type charging unit include a conductive or semi-conductive charging roller, a magnetic brush, a fur brush, a film, and a rubber blade. Among these contact type charging units, the charging roller can significantly suppress the amount of ozone emission compared with a corona discharge, is excellent in stability in repeated use of the image bearer, and is effective for prevention of image quality degradation. Examples of (2) the contactless charging unit include a contactless charger utilizing a corona discharge, a needle electrode device, a solid-state discharge element, and a conductive or semi-conductive charging roller disposed at a minute gap from the image bearer.

FIG. 5 also illustrates a cleaning unit 117. The cleaning unit 117 is not particularly limited and may be appropriately selected from known cleaners so long as the cleaner can remove the toner remaining on the photoconductor 115. Preferable examples of the cleaners include a magnetic brush cleaner, an electrostatic brush cleaner, a magnetic roller cleaner, a blade cleaner, a brush cleaner, and a web cleaner.

FIG. 5 also illustrates a recording medium 118.

(Image Forming Apparatus)

The image forming apparatus of the present embodiment includes at least an image bearer, a charging unit configured to charge the surface of the image bearer, a latent image forming unit configured to form an electrostatic latent image on the image bearer, a developing unit configured to attach a developer to the electrostatic latent image to form a visible image, a transfer unit configured to transfer the visible image onto a recording medium, and a cleaning unit configured to remove the developer attached on the surface of the image bearer. The image forming apparatus is characterized in that the developing unit is the developing roller of the present invention described above. The image forming apparatus may further include other units as needed. The charging unit and an exposure unit may be collectively referred to as a latent image forming unit. The details will be described below.

Figure 6:
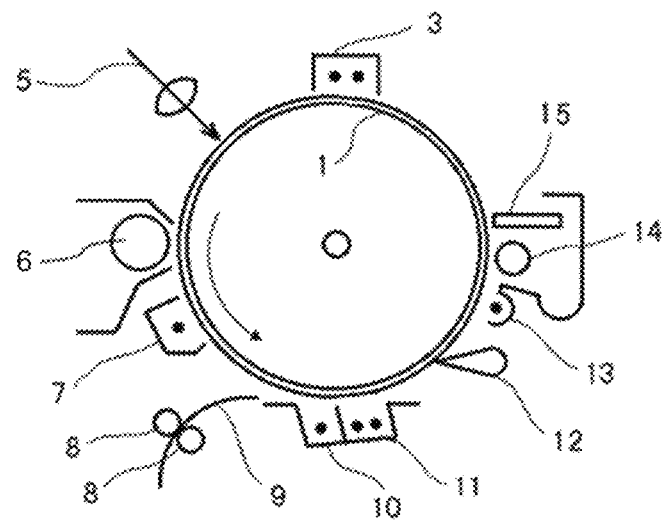
FIG. 6 is an exemplary view illustrating an example of an image forming apparatus of the present invention.

FIG. 6 illustrates an example of the configuration of the image forming apparatus of the present embodiment. In FIG. 6, for example, a charging unit 3, an exposure unit 5, a developing unit 6, a transfer unit 10, and a cleaning unit 15 are illustrated around an image bearer 1.

The outline of image formation will be described. First, the charging unit 3 charges the image bearer 1 averagely. Next, the exposure unit 5 forms an electrostatic latent image on the image bearer 1 charged uniformly. The developing unit 6 makes the electrostatic latent image formed on the image bearer 1 visible. The transfer unit 10 transfers the visible image made visible on the image bearer 1 onto a recording medium 9 that has been conveyed by a conveying roller 8. For better transfer, a pre-transfer charger 7 may be used. Subsequently, the cleaning unit 15 cleans the developer remaining on the image bearer.

The details of the units will be described below.

<Charging Unit>

The charging unit 3 of the present invention is not particularly limited. Examples of the charging unit 3 include a charging unit formed of an AC/DC superimposition charging roller configured to charge the surface of the image bearer uniformly. The charging unit 3 formed of a charging roller is a method of disposing a conductive roller (hereinafter referred to as charging roller) adjacent the image bearer and applying an electric field to the charging roller to generate a proximity discharge between the charging roller and the image bearer to charge the image bearer. The fur brush, etc. mentioned above may also be used.

<Exposure Unit>

The exposure unit 5 is not particularly limited and may be appropriately selected depending on the intended purpose so long as the exposure unit 5 can expose the surface of the image bearer charged by the charging unit 3 to light imagewise as the image to be formed. Examples of the exposure unit 5 include various exposure devices such as a photocopier optical system, a rod lens array system, a laser optical system, a liquid crystal shutter optical system, and an LED optical system.

The light source of the exposure device may be any light-emitting member such as a fluorescent lamp, a tungsten lamp, a halogen lamp, a mercury lamp, a sodium vapor lamp, a light-emitting diode (LED), a laser diode (LD), and electroluminescence (EL).

For irradiation with light of only a desired wavelength range, various filters such as a sharp cut filter, a band pass filter, a near-infrared cut filter, a dichroic filter, an interference filter, and a color conversion filter may be used. In the present invention, a backlighting system configured to expose the image bearer to light imagewise from the side of the back surface of the image bearer may also be employed.

<Developing Unit>

The developing roller of the present invention is used as the developing unit 6.

<Transfer Unit>

The transfer unit 10 is a unit configured to transfer the visible image onto a recording medium. The method for transfer includes a method of transferring the visible image from the surface of the image bearer directly onto the recording medium, and a method of using an intermediate transfer medium to primarily transfer the visible image onto the intermediate transfer medium and then secondarily transfer the visible image onto the recording medium 9. Both of the modes are preferable for use. However, the former mode (direct transfer) including the smaller number of transferring is more preferable when a significant adverse effect due to transferring is feared to occur in improving the image quality. The transferring can be performed by charging the image bearer by a transfer charger to transfer the visible image onto the recording medium 9.

The transfer unit 10 may employ: an electrostatic transfer method using, for example, a transfer charger or a bias roller; a mechanical transfer method such as an adhesive transfer method and a pressure transfer method; and a magnetic transfer method.

<Cleaning Unit>

The cleaning unit 15 is configured to remove the developer remaining on the image bearer. The cleaning unit 15 is not particularly limited, but a type configured to be disposed to contact the image bearer is preferable because what is intended is to remove the developer remaining on the surface of the image bearer. A known cleaner may be appropriately selected. Preferable examples of known cleaners include a magnetic brush cleaner, an electrostatic brush cleaner, a magnetic roller cleaner, a blade cleaner, a brush cleaner, and a web cleaner.

Among the cleaning methods mentioned above, a method suitable for removing the remaining developer from the image bearer may be selected for the cleaning unit 15. As needed, each method may be used alone or a plurality of methods may be used in combination.

<Other Units>

The other units are not particularly limited and may be appropriately selected depending on the intended purpose. Examples of the other units include a fixing unit, a charge eliminating unit, a recycling unit, a controlling unit, and a stripping unit.

Fixing Unit

The fixing unit is not particularly limited and may be appropriately selected depending on the intended purpose. A known heating/pressing unit is preferable. Examples of the heating/pressing unit include a combination of a heating roller and a pressing roller, and a combination of a heating roller, a pressing roller, and an endless belt. The heating by the heating/pressing unit is typically preferably at from 80 degrees C. through 200 degrees C. The fixing may be performed for each color toner when that color toner is transferred onto the recording medium, or may be performed simultaneously for all color toners in a state that the color toners are overlaid.

—Charge Eliminating Unit—

The charge eliminating unit 13 may be used in order to eliminate a latent image on the image bearer 1.

The charge eliminating unit 13 is not particularly limited and may be appropriately selected from known charge eliminating devices so long as the charge eliminating device can apply a charge eliminating bias to the image bearer. Preferable examples of known charge eliminating devices include a charge eliminating lamp and a charge eliminating charger.

—Recycling Unit—

A developer collecting unit 14 configured to recycle the developer attached on the image bearer may be used as a recycling unit.

The recycling unit is not particularly limited. Examples of the recycling unit include a known conveying unit.

—Controlling Unit—

The controlling unit is not particularly limited and may be appropriately selected depending on the intended purpose so long as the controlling unit can control the operation of each unit. Examples of the controlling unit include devices such as a sequencer and a computer.

—Stripping Unit—

A stripping charger 11 and a stripping claw 12 may be used as a unit configured to strip the recording medium 9 from the image bearer 1. Other examples of the method for stripping include electrostatic attraction induction stripping, side edge belt stripping, leading end gripping conveyance, and self-stripping.

(Image Forming Method)

The image forming method of the present embodiment includes: a charging step of charging the surface of the image bearer by a charging unit; a latent image forming step of forming an electrostatic latent image on the image bearer; a developing step of attaching a developer to the electrostatic latent image to form a visible image; a transfer step of transferring the visible image onto a recording medium; and a cleaning step of removing the developer attached on the surface of the image bearer. The developing step is characterized by attaching the developer to the electrostatic latent image by the developing roller of the present invention to form the visible image.

The process cartridge, the image forming apparatus, and the image forming method of the present invention can suppress abnormal images such as longitudinal white streaks in continued use of a developing roller, even when the developing roller used has a high releasability for suppression of filming.

EXAMPLES

The present invention will be described below by way of Examples and Comparative Examples. The present invention should not be construed as being limited to Examples presented below.

Example 1

An epichlorohydrin rubber HYDRIN T3106 available from Zeon Corporation was extrusion-molded on a 8 φ metal shaft (shaft body 22) made of SUS and having a diameter of 8 cm to have a rubber thickness of 4 mm, and subsequently fired and vulcanized in an environment of 150 degrees C. for 90 minutes. Subsequently, the roller surface was roughly polished with a polisher LE0600-F4L-BME available from Minakuchi Machinery Works Ltd., and then finish-polished with SZC available from Minakuchi Machinery Works Ltd. for 60 seconds using a tape count #30, at a cooling water temperature of 15 degrees C., at an oscillation frequency of 15 Hz, at a tape contact pressure of 3 Mpa, under fluctuation at a tape contact frequency of 1,675 Hz, and at a work rotation speed of 1,300 rpm to form an elastic layer 23, to obtain a rubber base for a developing roller.

Next, as the materials of a surface layer 24, fluoroethylene vinyl ether LF-200 available from Asahi Glass Co., Ltd. (fluoroethylene vinyl ether copolymer) (0.109 parts by mass), isocyanurate D170N available from Mitsui Chemicals, Inc. (an isocyanurate form of hexamethylene diisocyanate) (1 part by mass), carbon black ACL-4 available from Fuji Pigment Co., Ltd. (0.270 parts by mass), and silica H20TM available from Clariant AG (with an average primary particle diameter of 20 nm, hydrophobized silica) (0.022 parts by mass) were added to butyl acetate (6.5 parts by mass), and the materials were stirred with a roll mill for 60 minutes. To the resultant, a catalyst (NEOSTANN U-820 available from Nitto Kasei Co., Ltd.) (0.1 parts by mass) was added, and the materials were further stirred for 1 minute, to prepare a coating liquid for the surface layer 24. The obtained coating liquid was sprayed onto the surface of the rubber base for a developing roller with a spray coating machine available from Atmax, Inc., and the resultant was stored at 150 degrees C. for 1 hour, to obtain a developing roller 21 of Example 1.

The surface layer 24 had a film thickness of 1.5 µm. The grooves 25 had a width of 15 µm, a length of 50 µm, and a depth of 10 µm. The angle of the grooves 25 from a circumferential direction was 0 degrees. The number of grooves 25 was 800 per 1 mm$^2$.

Example 2

A developing roller of Example 2 was obtained in the same manner as in Example 1, except that unlike in Example 1, the tape contact frequency was changed from 1,675 Hz to 900 Hz, and the length of the grooves 25 was changed from 50 µm to 95 µm.

Example 3

A developing roller of Example 3 was obtained in the same manner as in Example 1, except that unlike in Example 1, the tape contact frequency was changed from 1,675 Hz to 3,350 Hz, and the length of the grooves 25 was changed from 50 µm to 21 µm.

Example 4

A developing roller of Example 4 was obtained in the same manner as in Example 1, except that unlike in Example 1, the finish-up polishing time was changed from 60 seconds to 120 seconds, and the depth of the grooves 25 was changed from 10 µm to 6 µm.

Example 5

A developing roller of Example 5 was obtained in the same manner as in Example 1, except that unlike in Example 1, the finish-up polishing time was changed from 60 seconds to 40 seconds, and the depth of the grooves 25 was changed from 10 μm to 14 μm.

Example 6

A developing roller of Example 6 was obtained in the same manner as in Example 1, except that unlike in Example 1, the tape count was changed from #30 to #40, and the width of the grooves 25 was changed from 15 μm to 10 μm.

Example 7

A developing roller of Example 7 was obtained in the same manner as in Example 1, except that unlike in Example 1, the tape count was changed from #30 to #20, and the width of the grooves 25 was changed from 15 μm to 20 μm.

Example 8

A developing roller of Example 8 was obtained in the same manner as in Example 1, except that unlike in Example 1, the oscillation frequency was changed from 15 Hz to 20 Hz, and the number of grooves 25 was changed from 800 to 1,080.

Example 9

A developing roller of Example 9 was obtained in the same manner as in Example 1, except that unlike in Example 1, the oscillation frequency was changed from 15 Hz to 12 Hz, and the number of grooves 25 was changed from 800 to 640.

Example 10

A developing roller of Example 10 was obtained in the same manner as in Example 1, except that unlike in Example 1, the content of butyl acetate was changed from 6.5 parts by mass to 14 parts by mass, the film thickness of the surface layer 24 was changed from 1.5 μm to 0.6 μm, and the width, length, and depth of the grooves 25 were changed to 16 μm, 51 μm, and 11 μm, respectively.

Example 11

A developing roller of Example 11 was obtained in the same manner as in Example 1, except that unlike in Example 1, the content of butyl acetate was changed from 6.5 parts by mass to 2.5 parts by mass, the film thickness of the surface layer 24 was changed from 1.5 μm to 2.0 μm, and the width and depth of the grooves 25 were changed to 14 μm and 9 μm, respectively.

Example 12

A developing roller of Example 12 was obtained in the same manner as in Example 1, except that unlike in Example 1, silica H20TM available from Clariant AG was changed to R976S available from Nippon Aerosil Co., Ltd. (with an average primary particle diameter of 7 nm, hydrophobized silica), and the length of the grooves 25 was changed from 50 μm to 49 μm.

Example 13

A developing roller of Example 13 was obtained in the same manner as in Example 1, except that unlike in Example 1, silica H20TM available from Clariant AG was changed to NAX50 available from Nippon Aerosil Co., Ltd. (with an average primary particle diameter of 30 nm).

Example 14

A developing roller of Example 14 was obtained in the same manner as in Example 1, except that unlike in Example 1, the content of silica H20TM available from Clariant AG was changed from 0.022 parts by mass to 0.034 parts by mass, and a filler solid content ratio was changed from 2.0% to 3.0%.

Example 15

A developing roller of Example 15 was obtained in the same manner as in Example 1, except that unlike in Example 1, the content of silica H20TM available from Clariant AG was changed from 0.022 parts by mass to 0.006 parts by mass, and a filler solid content ratio was changed from 2.0% to 0.5%.

Example 16

A developing roller of Example 16 was obtained in the same manner as in Example 1, except that unlike in Example 1, silica H20TM available from Clariant AG was not used.

Example 17

A developing roller of Example 17 was obtained in the same manner as in Example 1, except that unlike in Example 1, the tap contact frequency was changed from 1,675 Hz to 800 Hz, and the length of the grooves 25 was changed from 50 μm to 105 μm.

Example 18

A developing roller of Example 18 was obtained in the same manner as in Example 1, except that unlike in Example 1, the tap contact frequency was changed from 1,675 Hz to 3,900 Hz, and the length of the grooves 25 was changed from 50 μm to 17 μm.

Example 19

A developing roller of Example 19 was obtained in the same manner as in Example 1, except that unlike in Example 1, the finish-up polishing time was changed from 60 seconds to 30 seconds, and the depth of the grooves 25 was changed from 10 μm to 17 μm.

Example 20

A developing roller of Example 20 was obtained in the same manner as in Example 1, except that unlike in Example 1, the finish-up polishing time was changed from 60 seconds to 150 seconds, and the depth of the grooves 25 was changed from 10 μm to 4 μm.

Example 21

A developing roller of Example 21 was obtained in the same manner as in Example 1, except that unlike in Example 1, the tape count was changed from #30 to #10, and the width of the grooves 25 was changed from 15 μm to 24 μm.

Example 22

A developing roller of Example 22 was obtained in the same manner as in Example 1, except that unlike in Example 1, the tape count was changed from #30 to #50, and the width of the grooves 25 was changed from 15 μm to 8 μm.

Example 23

A developing roller of Example 23 was obtained in the same manner as in Example 1, except that unlike in Example 1, the oscillation frequency was changed from 15 Hz to 22 Hz, and the number of grooves 25 was changed from 800 to 1,180.

Example 24

A developing roller of Example 24 was obtained in the same manner as in Example 1, except that unlike in Example 1, the oscillation frequency was changed from 15 Hz to 10 Hz, and the number of grooves 25 was changed from 800 to 540.

Example 25

A developing roller of Example 25 was obtained in the same manner as in Example 1, except that unlike in Example 1, silica H20TM available from Clariant AG was changed to ALU130 available from Nippon Aerosil Co., Ltd. (with an average primary particle diameter of 20 nm, alumina).

Example 26

A developing roller of Example 26 was obtained in the same manner as in Example 1, except that unlike in Example 1, the content of silica H20TM available from Clariant AG was changed from 0.022 parts by mass to 0.039 parts by mass, and a filler solid content ratio was changed from 2.0% to 3.3%.

Example 27

A developing roller of Example 27 was obtained in the same manner as in Example 1, except that unlike in Example 1, the angle of the grooves 25 from the circumferential direction was changed from 0 degrees to 15 degrees, and the width, length, and depth of the grooves 25 were changed to 17 μm, 52 μm, and 9 μm, respectively.

Example 28

A developing roller of Example 28 was obtained in the same manner as in Example 1, except that unlike in Example 1, the angle of the grooves 25 from the circumferential direction was changed from 0 degrees to 30 degrees, and the width, length, and depth of the grooves 25 were changed to 19 μm, 54 μm, and 8 μm, respectively.

Comparative Example 1

A developing roller of Comparative Example 1 was obtained in the same manner as in Example 1, except that unlike in Example 1, the content of butyl acetate was changed from 6.5 parts by mass to 16 parts by mass, the film thickness of the surface layer 24 was changed from 1.5 μm to 0.4 μm, and the width, length, and depth of the grooves 25 in the elastic layer 23 were changed to 16 μm, 52 μm, and 11 μm, respectively.

Comparative Example 2

A developing roller of Comparative Example 2 was obtained in the same manner as in Example 1, except that unlike in Example 1, the content of butyl acetate was changed from 6.5 parts by mass to 2 parts by mass, the film thickness of the surface layer 24 was changed from 1.5 μm to 2.3 μm, and the width, length, and depth of the grooves 25 were changed to 13 μm, 48 μm, and 7 μm, respectively.

Comparative Example 3

A developing roller of Comparative Example 3 was obtained in the same manner as in Example 1, except that unlike in Example 1, the tape count was changed from #30 to #100, the oscillation frequency and the tape contact pressure frequency were not applied, and the grooves 25 were not formed.

Comparative Example 4

A developing roller of Comparative Example 4 was obtained in the same manner as in Example 1, except that unlike in Example 1, fluoroethylene vinyl ether LF-200 available from Asahi Glass Co., Ltd. (0.109 parts by mass) was changed to polyurethane polyol A2789 available from Mitsui Chemicals, Inc. (0.248 parts by mass).

Comparative Example 5

A developing roller of Comparative Example 5 was obtained in the same manner as in Example 1, except that unlike in Example 1, fluoroethylene vinyl ether LF-200 available from Asahi Glass Co., Ltd. (0.109 parts by mass) was changed to LF-600 available from Asahi Glass Co., Ltd. (0.094 parts by mass), and isocyanurate D170N available from Mitsui Chemicals, Inc. (1 part by mass) was changed to divalent isocyanate D101 available from Asahi Kasei Chemicals Corporation (1 part by mass).

LF-600 available from Asahi Glass Co., Ltd. was a fluoroethylene vinyl ether copolymer, which was a side-chain long-elongated type. Therefore, the distance between cross-linking points would be very long.

Divalent isocyanate D101 available from Asahi Kasei Chemicals Corporation was a bifunctional type, and not an isocyanurate form.

Comparative Example 6

A developing roller of Comparative Example 6 was obtained in the same manner as in Example 1, except that unlike in Example 1, the angle of the grooves 25 from the circumferential direction was changed from 0 degrees to 40 degrees, the width, length, and depth of the grooves 25 were changed to 21 μm, 62 μm, and 8 μm, respectively, and a filler solid content ratio was changed from 2.0% to 0.02%.
(Evaluation Methods)

The developing rollers obtained above were evaluated in the manners described below. In the evaluation methods 1 to 3 below, the non-problematic level as a product is C or higher.

1. Scaly Image

In an environment of 10 degrees C. and 15% RH, IPSIO C730 available from Ricoh Company, Ltd. was mounted with each of the developing rollers obtained above and run on 40,000 sheets at 1% yield 1 P/J. Subsequently, a 2-by-2 halftone image was collected to evaluate scaly images (density unevenness) according to the evaluation criterial described below.

Evaluation of scaly images (density unevenness) was performed with 938 available from X-rite Inc. The value to be evaluated according to the evaluation criteria described below was obtained by measuring the density from 20 points and calculating the difference between the maximum (MAX) and the minimum (MIN) of the density data [maximum (MAX)−minimum (MIN)].

[Evaluation Criteria]
A: Less than 0.03
B: 0.03 or greater but less than 0.07
C: 0.07 or greater but less than 0.10
D: 0.10 or greater 2. Longitudinal White Streak In an environment of 27 degrees C. and 80% RH, IPSIO C730 available from Ricoh Company, Ltd. was mounted with each of the developing rollers obtained above and run on 40,000 sheets at 1% yield 1 P/J. Subsequently, a halftone image/black solid image was collected to evaluate longitudinal white streaks according to the evaluation criteria described below.

[Evaluation Criteria]
A: There was no white streak in the longitudinal direction on the image.
B: There was 1 white streak in the longitudinal direction on the image.
C: There were 2 white streaks in the longitudinal direction on the image.
D: There were 3 or more white streaks in the longitudinal direction on the image.

3. Filming

In an environment of 27 degrees C. and 80% RH, IPSIO C730 available from Ricoh Company, Ltd. was mounted with each of the developing rollers obtained above and run on 20,000 sheets at 1% yield 1 P/J. Subsequently, the amount of silica adhering on the surface of the developing roller was measured with FTIR (Fourier transform infrared spectrophotometer) to evaluate filming according to the evaluation criteria described below. The value to be evaluated according to the evaluation criteria described below was obtained by an analysis employing an ATR method of FT-IR (available from Thermo Nicolet Corporation, NEXUS470). Specifically, the value to be evaluated according to the evaluation criteria described below was obtained by determining a specific peak (from about 1,680 cm$^{-1}$ through about 1,690 cm$^{-1}$) of C=O of cyanurate and a specific peak (from about 1,710 cm$^{-1}$ through about 1,730 cm$^{-1}$) of C=O of urethane from obtained IR spectra, and calculating a peak intensity ratio between the peaks [(specific peak of C=O of cyanurate)/(specific peak of C=O of urethane)].

[Evaluation Criteria]
A: Less than 0.03
B: 0.03 or greater but less than 0.10
C: 0.10 or greater but less than 0.40
D: 0.40 or greater 4. Dimensions of Grooves An image of the grooves was captured with a laser microscope VK8700 available from Keyence Corporation using a ×50 lens at a pitch of 0.1 μm. From the concave-convex profile, the distance between the convexes was measured from 100 grooves and the distance values of the 100 grooves was averaged as the width of the grooves 25. Likewise, the height difference from the convex to the concave was averaged for 100 grooves as the depth of the grooves 25, and the circumferential direction length of the concave was averaged for 100 grooves as the length of the grooves 25.

5. Toner

The toner used in the evaluations described above is described below.

<Method for Producing Resin Dispersion>

Sodium dodecyl sulfate (0.7 parts by mass) and ion-exchanged water (498 parts by mass) were put in a reaction vessel equipped with a condenser tube, a stirrer, and a nitrogen introducing tube, and dissolved under stirring and heating to 80 degrees C. Subsequently, potassium persulfate (2.6 parts by mass) dissolved in ion-exchanged water (104 parts by mass) was added to the resultant. Fifteen minutes later, a monomer mixture liquid of a styrene monomer (200 parts by mass) and n-octanethiol (4.2 parts by mass) was dropped into the resultant for 90 minutes. Subsequently, the resultant was allowed to undergo a polymerization reaction for 60 minutes under retention at 80 degrees C., to obtain a white resin dispersion having a volume average particle diameter of 135 nm.

Two milliliters of this resin dispersion was picked in a petri dish, and the dispersion medium was evaporated from the petri dish, to obtain a dried matter, which was measured to have a number average molecular weight of 8,300, a weight average molecular weight of, 16,900, and Tg of 83 degrees C.

<Synthesis of Polyester 1>

Bisphenol A-ethylene oxide 2 mol adduct (229 parts by mass), bisphenol A-propion oxide 3 mol adduct (529 parts by mass), terephthalic acid (208 parts by mass), adipic acid (46 parts by mass), dibutyl tin oxide (2 parts by mass) were put in a reaction tank equipped with a condenser tube, a stirrer, a nitrogen introducing tube, and allowed to undergo a reaction at normal pressure at 230 degrees C. for 8 hours. The resultant was further allowed to undergo a reaction at a reduced pressure of from 10 mmHg through 15 mmHg for 5 hours. Subsequently, trimellitic anhydride (44 parts by mass) was added to the reaction tank, and the materials were allowed to undergo a reaction at normal pressure at 180 degrees C. for 2 hours, to synthesize polyester 1.

The obtained polyester 1 had a number average molecular weight of 2,500, a weight average molecular weight of 6,700, a glass transition temperature of 43 degrees C., and an acid value of 25 mgKOH/g.

<Synthesis of Polyester 2>

Bisphenol A-ethylene oxide 2 mol adduct (264 parts by mass), bisphenol A-propylene oxide 2 mol adduct (523 parts by mass), terephthalic acid (123 parts by mass), adipic acid (173 parts by mass), and dibutyl tin oxide (1 part by mass) were put in a reaction vessel equipped with a condenser tube, a stirrer, and a nitrogen introducing tube, and allowed to undergo a reaction at normal pressure at 230 degrees C. for 8 hours. The resultant was further allowed to undergo a reaction at a reduced pressure of from 10 mmHg through 15 mmHg for 8 hours. Subsequently, trimellitic anhydride (26 parts by mass) was put in the reaction vessel, and the materials were allowed to undergo a reaction at 180 degrees C. at normal pressure for 2 hours, to obtain polyester 2.

The obtained polyester 2 had a number average molecular weight of 4,000, a weight average molecular weight of 47,000, a glass transition temperature of 65 degrees C., and an acid value of 12 mgKOH/g.

<Synthesis of Isocyanate-Modified Polyester>

Bisphenol A-ethylene oxide 2 mol adduct (682 parts by mass), bisphenol A-propylene oxide 2 mol adduct (81 parts by mass), terephthalic acid (283 parts by mass), trimellitic anhydride (22 parts by mass), and dibutyl tin oxide (2 parts by mass) were put in a reaction vessel equipped with a condenser tube, a stirrer, and a nitrogen introducing tube, and allowed to undergo a reaction at normal pressure at 230 degrees C. for 8 hours. The resultant was further allowed to undergo a reaction at a reduced pressure of 10 mmHg through 15 mmHg for 5 hours, to synthesize an intermediate polyester.

The obtained intermediate polyester had a number average molecular weight of 2,200, a weight average molecular weight of 9,700, a glass transition temperature of 54 degrees C., an acid value of 0.5 mgKOH/g, and a hydroxyl value of 52 mgKOH/g.

Next, the intermediate polyester (410 parts by mass), isophorone diisocyanate (89 parts by mass), and ethyl acetate (500 parts by mass) were put in a reaction vessel equipped with a condenser tube, a stirrer, and a nitrogen introducing tube, and allowed to undergo a reaction at 100 degrees C. for 5 hours, to obtain an isocyanate-modified polyester.

<Production of Masterbatch>

Carbon black (available from Cabot Corporation, REGAL 400R) (40 parts by mass), a binder resin, which was a polyester resin (available from Sanyo Chemical Industries, Ltd., RS-801, with an acid value of 10 mgKOH/g, Mw of 20,000, and Tg of 64 degrees C.) (60 parts by mass), and water (30 parts by mass) were mixed with a Henschel mixer, to obtain a mixture in which a pigment aggregate was soaked with water. The mixture was kneaded with 2 rolls set to a roll surface temperature of 130 degrees C. for 45 minutes, and pulverized with a pulverizer to a size of 1 mm, to obtain a masterbatch.

<Oil Phase Producing Step>

The polyester 1 (545 parts by mass), [paraffin wax (with a melting point of 74 degrees C.)] (181 parts by mass), and ethyl acetate (1,450 parts by mass) were put in a vessel equipped with a stirring rod and a thermometer, heated to 80 degrees C. under stirring, retained at 80 degrees C. for 5 hours, and then cooled to 30 degrees C. for 1 hour.

Next, the masterbatch (500 parts by mass) and ethyl acetate (100 parts by mass) were put in the vessel, and the materials were mixed for 1 hour to obtain a material dissolved liquid. The material dissolved liquid (1,500 parts by mass) was changed to another vessel, and subjected to dispersion of the pigment and the wax using a bead mill (ULTRAVISCO MILL available from Imex Co., Ltd.) at a liquid sending speed of 1 kg/hr, at a disk peripheral velocity of 6 m/second, with 0.5 mm zirconia beads packed to 80% by volume, and for 3 passes.

Next, a 66% by mass ethyl acetate solution (655 parts by mass) of the polyester 2 was added to the resultant. The resultant was subjected to 1 pass with the bead mill under the conditions described above, to obtain a pigment/wax dispersion liquid. The pigment/wax dispersion liquid (976 parts by mass) was mixed with a TK homomixer (available from Primix Corporation) at 5,000 rpm for 1 minute. Subsequently, the isocyanate-modified polyester (88 parts by mass) was added to the resultant. The materials were mixed with the TK homomixer (available from Primix Corporation) at 5,000 rpm for 1 minute, to obtain an oil phase.

The concentration of the solid content of the obtained oil phase was measured and was 52.0% by mass. The amount of ethyl acetate in the solid content was 92% by mass.

<Preparation of Aqueous Phase>

Ion-exchanged water (970 parts by mass), a 25% by mass aqueous dispersion liquid (40 parts by mass) of organic resin particles for dispersion stability (copolymer of styrene/methacrylic acid/butyl acrylate/sodium salt of sulfate of methacrylic acid-ethylene oxide adduct), a 48.5% by mass aqueous solution (95 parts by mass) of sodium dodecyldiphenyl ether disulfonate, and ethyl acetate (98 parts by mass) were mixed and stirred, resulting in pH of 6.2. To the resultant, a 10% by mass sodium hydroxide aqueous solution was dropped to adjust pH to 9.5, to obtain an aqueous phase <Core Particle Producing Step>

The aqueous phase (1,200 parts by mass) was added to the oil phase, and these materials were mixed with a TK homomixer for 2 minutes while the rotation speed was adjusted to from 8,000 rpm through 15,000 rpm and the temperature in the liquid was adjusted to be within a range of from 20 degrees C. through 23 degrees C. under cooling in a water bath in order to suppress temperature rise due to shearing heat of the mixer. The resultant was stirred for 10 minutes with a three-one motor equipped with an anchor blade while the rotation speed was adjusted to from 130 rpm through 350 rpm, to obtain a core particle slurry in which liquid droplets of the oil phase to become core particles were dispersed in the aqueous phase.

<Formation of Shell Portion>

A mixture (with a solid content concentration of 15% by mass) of the resin dispersion (106 parts by mass) and ion-exchanged water (71 parts by mass) was dropped for 3 minutes into the core particle slurry under stirring with a three-one motor equipped with an anchor blade with the rotation speed adjusted to from 130 rpm through 350 rpm at a liquid temperature of 22 degrees C. The resultant was further stirred for 30 minutes with the rotation speed adjusted to from 200 rpm through 450 rpm, to obtain a composite particle slurry. One milliliter of the composite particle slurry was taken out, diluted to 10 mL, and subjected to centrifugation. As a result, the supernatant was transparent.

<Desolventizing Step>

The composite particle slurry was put in a vessel equipped with a stirrer and a thermometer and desolventized at 30 degrees C. for 8 hours under stirring, to obtain a dispersed slurry. A small amount of this slurry was put on a glass slide and observed through a cover class with an optical microscope at a magnification of ×200. As a result, uniform coloring particles were observed. The slurry was further diluted 10-fold and subjected to centrifugation. As a result, the supernatant was transparent.

<Washing Step>

The dispersed slurry (100 parts by mass) was filtered at reduced pressure and washed according to the procedure described below, to obtain a filtration cake.

Ion-exchanged water (100 parts by mass) was added to the filtration cake, and the resultant was mixed with a TK homomixer (at a rotation speed of 12,000 rpm for 10 minutes). Subsequently, the resultant was filtered.

Ion-exchanged water (900 parts by mass) was added to the obtained filtration cake, and the resultant was mixed with the TK homomixer (at a rotation speed of 12,000 rpm for 30 minutes) under application of ultrasonic vibration. Subsequently, the resultant was filtered at reduced pressure. This operation was repeated such that the electric conductivity of the reslurry liquid became 10 μC/cm or less.

A 10% by mass hydrochloric acid was added to the obtained reslurry liquid to adjust pH to 4. Then, the resultant was stirred with a three-one motor for 30 minutes and then filtrated.

Ion-exchanged water (100 parts by mass) was added to the obtained filtration cake, and the resultant was mixed with the TK homomixer (at a rotation speed of 12,000 rpm for 10 minutes). Subsequently, the resultant was filtrated.

The operation was repeated until the electric conductivity of the reslurry liquid became 10 μC/cm or less.

<Drying Step>

The filtration cake was dried with an air circulating drier at 45 degrees C. for 48 hours, and sieved through a mesh having a mesh size of 75 μm, to obtain a toner base.

<Externally Adding Step>

Relative to 100 parts by mass of the toner base, external additives, namely R8200 (hydrophobic silica) available from Nippon Aerosil Co., Ltd. (1.5 parts by mass), RY50 (hydrophobic silica) available from Nippon Aerosil Co., Ltd. (3.0 parts by mass), and SW360 (strontium titanate) available from Titan Kogyo, Ltd. (0.6 parts by mass) were stirred with a Henschel mixer and sieved. The external additives were attached on the surface of the toner base particles, to obtain a toner for evaluation. The coverage on the toner base particles was 180%.

The average particle diameter of the obtained toner was 6.0 μm.

The prescriptions and evaluation results of Examples and Comparative Examples are presented in Table 1 (1-1, 1-2, 1-3). In (1-2), "FEVE" represents the fluoroethylene vinyl ether copolymer, "NCO" represents the isocyanurate form of isocyanate, and "filler diameter" represents the average primary particle diameter of the inorganic particles (filler).

In Examples 1 to 26 and Comparative Examples 1, 2, 4, and 5, the angle of the grooves 25 from the circumferential direction was 0 degrees.

TABLE 1

| | | Polishing condition | | | | Surface layer | | | |
| | | | | | | Butyl acetate | | | |
| | Count | Oscillation Frequency | Frequency | Finishing time | Polishing angle | (part by mass) | FEVE (part by mass) | NCO (part by mass) | Filler (part by mass) | Kind of filler |
|---|---|---|---|---|---|---|---|---|---|---|
| Ex. | | | | | | | | | | |
| 1 | #30 | 15 Hz | 1675 Hz | 60 sec | 0 | 6.5 | 0.109 | 1 | 0.022 | H20TM |
| 2 | #30 | 15 Hz | 900 Hz | 60 sec | 0 | 6.5 | 0.109 | 1 | 0.022 | H20TM |
| 3 | #30 | 15 Hz | 3350 Hz | 60 sec | 0 | 6.5 | 0.109 | 1 | 0.022 | H20TM |
| 4 | #30 | 15 Hz | 1675 Hz | 120 sec | 0 | 6.5 | 0.109 | 1 | 0.022 | H20TM |
| 5 | #30 | 15 Hz | 1675 Hz | 40 sec | 0 | 6.5 | 0.109 | 1 | 0.022 | H20TM |
| 6 | #40 | 15 Hz | 1675 Hz | 60 sec | 0 | 6.5 | 0.109 | 1 | 0.022 | H20TM |
| 7 | #20 | 15 Hz | 1675 Hz | 60 sec | 0 | 6.5 | 0.109 | 1 | 0.022 | H20TM |
| 8 | #30 | 20 Hz | 1675 Hz | 60 sec | 0 | 6.5 | 0.109 | 1 | 0.022 | H20TM |
| 9 | #30 | 12 Hz | 1675 Hz | 60 sec | 0 | 6.5 | 0.109 | 1 | 0.022 | H20TM |
| 10 | #30 | 15 Hz | 1675 Hz | 60 sec | 0 | 14 | 0.109 | 1 | 0.022 | H20TM |
| 11 | #30 | 15 Hz | 1675 Hz | 60 sec | 0 | 2.5 | 0.109 | 1 | 0.022 | H20TM |
| 12 | #30 | 15 Hz | 1675 Hz | 60 sec | 0 | 6.5 | 0.109 | 1 | 0.022 | R976S |
| 13 | #30 | 15 Hz | 1675 Hz | 60 sec | 0 | 6.5 | 0.109 | 1 | 0.022 | NAX50 |
| 14 | #30 | 15 Hz | 1675 Hz | 60 sec | 0 | 6.5 | 0.109 | 1 | 0.034 | H20TM |
| 15 | #30 | 15 Hz | 1675 Hz | 60 sec | 0 | 6.5 | 0.109 | 1 | 0.006 | H20TM |
| 16 | #30 | 15 Hz | 1675 Hz | 60 sec | 0 | 6.5 | 0.109 | 1 | 0 | — |
| 17 | #30 | 15 Hz | 800 Hz | 60 sec | 0 | 6.5 | 0.109 | 1 | 0.022 | H20TM |
| 18 | #30 | 15 Hz | 3900 Hz | 60 sec | 0 | 6.5 | 0.109 | 1 | 0.022 | H20TM |
| 19 | #30 | 15 Hz | 1675 Hz | 30 sec | 0 | 6.5 | 0.109 | 1 | 0.022 | H20TM |
| 20 | #30 | 15 Hz | 1675 Hz | 150 sec | 0 | 6.5 | 0.109 | 1 | 0.022 | H20TM |
| 21 | #10 | 15 Hz | 1675 Hz | 60 sec | 0 | 6.5 | 0.109 | 1 | 0.022 | H20TM |
| 22 | #50 | 15 Hz | 1675 Hz | 60 sec | 0 | 6.5 | 0.109 | 1 | 0.022 | H20TM |
| 23 | #30 | 22 Hz | 1675 Hz | 60 sec | 0 | 6.5 | 0.109 | 1 | 0.022 | H20TM |
| 24 | #30 | 10 Hz | 1675 Hz | 60 sec | 0 | 6.5 | 0.109 | 1 | 0.022 | H20TM |
| 25 | #30 | 15 Hz | 1675 Hz | 60 sec | 0 | 6.5 | 0.109 | 1 | 0.022 | ALU130 |
| 26 | #30 | 15 Hz | 1675 Hz | 60 sec | 0 | 6.5 | 0.109 | 1 | 0.039 | H20TM |
| 27 | #30 | 15 Hz | 1675 Hz | 60 sec | 15 | 6.5 | 0.109 | 1 | 0.022 | H20TM |
| 28 | #30 | 15 Hz | 1675 Hz | 60 sec | 30 | 6.5 | 0.109 | 1 | 0.022 | H20TM |
| Comp. Ex. | | | | | | | | | | |
| 1 | #30 | 15 Hz | 1675 Hz | 60 sec | 0 | 16 | 0.109 | 1 | 0.022 | H20TM |
| 2 | #30 | 15 Hz | 1675 Hz | 60 sec | 0 | 2 | 0.109 | 1 | 0.022 | H20TM |
| 3 | #100 | 0 Hz | 0 Hz | 60 sec | 0 | 6.5 | 0.109 | 1 | 0.022 | H20TM |
| 4 | #30 | 15 Hz | 1675 Hz | 60 sec | 0 | 6.5 | A2789/ 0.2484 | | 1 | 0.022 | H20TM |
| 5 | #30 | 15 Hz | 1675 Hz | 60 sec | 0 | 6.5 | LF600/ 0.094 | D101/1 | 0.022 | H20TM |
| 6 | #30 | 15 Hz | 1675 Hz | 60 sec | 40 | 6.5 | 0.109 | 1 | 0.022 | H20TM |

TABLE 1-continued

| | Surface layer | | | Polishing condition | | | | Evaluation on actual machine | | |
|---|---|---|---|---|---|---|---|---|---|---|
| | Filler Diameter | Filler solid content ratio | Film thickness | Width | Length | Depth | Number of grooves | Scale | Streak | Filming |
| Ex. | | | | | | | | | | |
| 1 | 20 nm | 2.0% | 1.5 μm | 15 μm | 50 μm | 10 μm | 800 | A | A | A |
| 2 | 20 nm | 2.0% | 1.5 μm | 15 μm | 95 μm | 10 μm | 800 | A | B | A |
| 3 | 20 nm | 2.0% | 1.5 μm | 15 μm | 21 μm | 10 μm | 800 | A | A | B |
| 4 | 20 nm | 2.0% | 1.5 μm | 15 μm | 50 μm | 6 μm | 800 | A | B | A |
| 5 | 20 nm | 2.0% | 1.5 μm | 15 μm | 50 μm | 14 μm | 800 | B | A | B |
| 6 | 20 nm | 2.0% | 1.5 μm | 10 μm | 50 μm | 10 μm | 800 | B | A | B |
| 7 | 20 nm | 2.0% | 1.5 μm | 20 μm | 50 μm | 10 μm | 800 | A | B | A |
| 8 | 20 nm | 2.0% | 1.5 μm | 15 μm | 50 μm | 10 μm | 1080 | A | A | A |
| 9 | 20 nm | 2.0% | 1.5 μm | 15 μm | 50 μm | 10 μm | 640 | A | B | A |
| 10 | 20 nm | 2.0% | 0.6 μm | 16 μm | 51 μm | 11 μm | 800 | B | A | B |
| 11 | 20 nm | 2.0% | 2.0 μm | 14 μm | 50 μm | 9 μm | 800 | A | B | A |
| 12 | 7 nm | 2.0% | 1.5 μm | 15 μm | 49 μm | 10 μm | 800 | B | B | A |
| 13 | 30 nm | 2.0% | 1.5 μm | 15 μm | 50 μm | 10 μm | 800 | B | A | A |
| 14 | 20 nm | 3.0% | 1.5 μm | 15 μm | 50 μm | 10 μm | 800 | A | B | A |
| 15 | 20 nm | 0.5% | 1.5 μm | 15 μm | 50 μm | 10 μm | 800 | B | B | A |
| 16 | — | 0.0% | 1.5 μm | 15 μm | 50 μm | 10 μm | 800 | B | B | B |
| 17 | 20 nm | 2.0% | 1.5 μm | 15 μm | 105 μm | 10 μm | 800 | A | C | A |
| 18 | 20 nm | 2.0% | 1.5 μm | 15 μm | 17 μm | 10 μm | 800 | C | A | C |
| 19 | 20 nm | 2.0% | 1.5 μm | 15 μm | 50 μm | 17 μm | 800 | B | A | C |
| 20 | 20 nm | 2.0% | 1.5 μm | 15 μm | 50 μm | 4 μm | 800 | A | C | A |
| 21 | 20 nm | 2.0% | 1.5 μm | 24 μm | 50 μm | 10 μm | 800 | A | C | A |
| 22 | 20 nm | 2.0% | 1.5 μm | 8 μm | 50 μm | 10 μm | 800 | C | A | C |
| 23 | 20 nm | 2.0% | 1.5 μm | 15 μm | 50 μm | 10 μm | 1180 | C | A | C |
| 24 | 20 nm | 2.0% | 1.5 μm | 15 μm | 50 μm | 10 μm | 540 | A | C | A |
| 25 | 20 nm | 2.0% | 1.5 μm | 15 μm | 50 μm | 10 μm | 800 | B | C | B |
| 26 | 20 nm | 3.3% | 1.5 μm | 15 μm | 50 μm | 10 μm | 800 | A | C | A |
| 27 | 20 nm | 2.0% | 1.5 μm | 17 μm | 52 μm | 9 μm | 800 | A | B | A |
| 28 | 20 nm | 2.0% | 1.5 μm | 19 μm | 54 μm | 8 μm | 800 | A | C | A |
| Comp. Ex. | | | | | | | | | | |
| 1 | 20 nm | 2.0% | 0.4 μm | 16 μm | 52 μm | 11 μm | 800 | D | A | D |
| 2 | 20 nm | 2.0% | 2.3 μm | 13 μm | 48 μm | 7 μm | 800 | A | D | A |
| 3 | 20 nm | 2.0% | 1.5 μm | — | — | — | — | D | D | B |
| 4 | 20 nm | 2.0% | 1.5 μm | 15 μm | 50 μm | 10 μm | 800 | D | D | D |
| 5 | 20 nm | 2.0% | 1.5 μm | 15 μm | 50 μm | 10 μm | 800 | B | D | B |
| 6 | 20 nm | 2.0% | 1.5 μm | 21 μm | 62 μm | 8 μm | 800 | B | D | B |

What is claimed is:

1. A developing roller comprising:
a shaft body;
an elastic layer formed on an external circumference of the shaft body; and
a surface layer formed on an external circumference of the elastic layer,
wherein the surface layer comprises polyurethane that comprises a reaction product of a fluoroethylene vinyl ether copolymer and an isocyanurate form of isocyanate, the polyurethane having a film thickness of from 0.5 μm through 2.0 μm, and
wherein the developing roller comprises grooves in a surface of the developing roller, an angle of the grooves from a circumferential direction being from 0 degrees through 30 degrees.

2. The developing roller according to claim 1, wherein the grooves have a width of from 10 μm through 20 μm.

3. The developing roller according to claim 1, wherein the grooves have a length of from 20 μm through 100 μm.

4. The developing roller according to claim 1, wherein the grooves have a depth of from 5 μm through 15 μm.

5. The developing roller according to claim 1, wherein number of the grooves formed per 1 mm² is from 600 through 1,100.

6. The developing roller according to claim 1, wherein the isocyanurate form of isocyanate comprises an isocyanurate form of hexamethylene diisocyanate.

7. The developing roller according to claim 1, wherein the surface layer comprises inorganic particles.

8. The developing roller according to claim 7, wherein the inorganic particles comprise hydrophobized silica having an average primary particle diameter of from 5 nm through 30 nm.

9. The developing roller according to claim 7, wherein a content of the inorganic particles is from 0.5% by mass through 3.0% by mass of a total amount of the surface layer.

10. A process cartridge comprising
the developing roller according to claim 1.

11. An image forming apparatus comprising:
an image bearer;
a charging unit configured to charge a surface of the image bearer;
a latent image forming unit configured to form an electrostatic latent image on the image bearer;
a developing unit configured to attach a developer to the electrostatic latent image to form a visible image;
a transfer unit configured to transfer the visible image onto a recording medium; and a cleaning unit configured to remove the developer attached on the surface of the image bearer, wherein the developing unit comprises the developing roller according to claim 1.

12. An image forming method comprising:

charging a surface of an image bearer by a charging unit;

forming an electrostatic latent image on the image bearer;

attaching a developer to the electrostatic latent image to form a visible image;

transferring the visible image onto a recording medium; and removing the developer attached on the surface of the image bearer, wherein in the attaching the developer, the developer is attached to the electrostatic latent image by the developing roller according to claim 1 to form the visible image.

* * * * *